(12) United States Patent
Al Bawab et al.

(10) Patent No.: US 11,120,788 B2
(45) Date of Patent: Sep. 14, 2021

(54) ORGANIZATIONAL-BASED LANGUAGE MODEL GENERATION

(71) Applicant: Microsoft Technology Licensing, LLC, Redmond, WA (US)

(72) Inventors: Ziad Al Bawab, Sunnyvale, CA (US); Anand U Desai, Sunnyvale, CA (US); Cem Aksoylar, Kirkland, WA (US); Michael Levit, San Jose, CA (US); Xin Meng, Sunnyvale, CA (US); Shuangyu Chang, Sunnyvale, CA (US); Suyash Choudhury, Kirkland, WA (US); Dhiresh Rawal, Redmond, WA (US); Tao Li, Redmond, WA (US); Rishi Girish, Seattle, WA (US); Marcus Jager, Boulder Creek, CO (US); Ananth Rampura Sheshagiri Rao, Sunnyvale, CA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 165 days.

(21) Appl. No.: 16/454,621

(22) Filed: Jun. 27, 2019

(65) Prior Publication Data

US 2020/0349920 A1 Nov. 5, 2020

Related U.S. Application Data

(60) Provisional application No. 62/841,982, filed on May 2, 2019.

(51) Int. Cl.
*G10L 15/06* (2013.01)
*G06N 20/00* (2019.01)
(Continued)

(52) U.S. Cl.
CPC ............ *G10L 15/063* (2013.01); *G06N 20/00* (2019.01); *G10L 15/14* (2013.01); *G10L 15/183* (2013.01)

(58) Field of Classification Search
CPC ..... G10L 15/063; G10L 15/183; G06N 20/00; G06N 20/20; G06F 40/20
(Continued)

(56) References Cited

U.S. PATENT DOCUMENTS 6,188,976 B1    2/2001  Ramaswamy et al.
10,186,255 B2 *  1/2019  Tapuhi ................. G06N 20/00
(Continued)

FOREIGN PATENT DOCUMENTS

JP         2005208483 A     8/2005

OTHER PUBLICATIONS

"International Search Report and Written Opinion Issued in PCT Application No. PCT/US2020/022417", dated Jun. 17, 2020, 8 Pages.

*Primary Examiner* — Susan I McFadden
(74) *Attorney, Agent, or Firm* — Buckley, Maschoff & Talwalkar LLC

(57) ABSTRACT

Provided is a system and method for acquiring training data and building an organizational-based language model based on the training data. In one example, the method may include collecting organizational data that is generated via one or more applications associated with an organization, aggregating the collected organizational data with previously collected organizational data to generate aggregated organizational training data, training an organizational-based language model for speech processing based on the aggregated organizational training data, and storing the trained organizational-based language model.

21 Claims, 7 Drawing Sheets

(51) Int. Cl.
*G10L 15/14* (2006.01)
*G10L 15/183* (2013.01)

(58) Field of Classification Search
USPC .......................................... 704/231
See application file for complete search history.

(56) References Cited

U.S. PATENT DOCUMENTS

| | | | | |
|---|---|---|---|---|
| 10,311,859 | B2* | 6/2019 | Lev-Tov | G10L 15/063 |
| 10,643,604 | B2* | 5/2020 | Tapuhi | G06F 40/232 |
| 10,657,125 | B1* | 5/2020 | Gautam | G06F 40/40 |
| 10,672,383 | B1* | 6/2020 | Thomson | G10L 15/183 |
| 2015/0332670 | A1 | 11/2015 | Hakkani-tur | |
| 2017/0206891 | A1 | 7/2017 | Lev-tov et al. | |

* cited by examiner

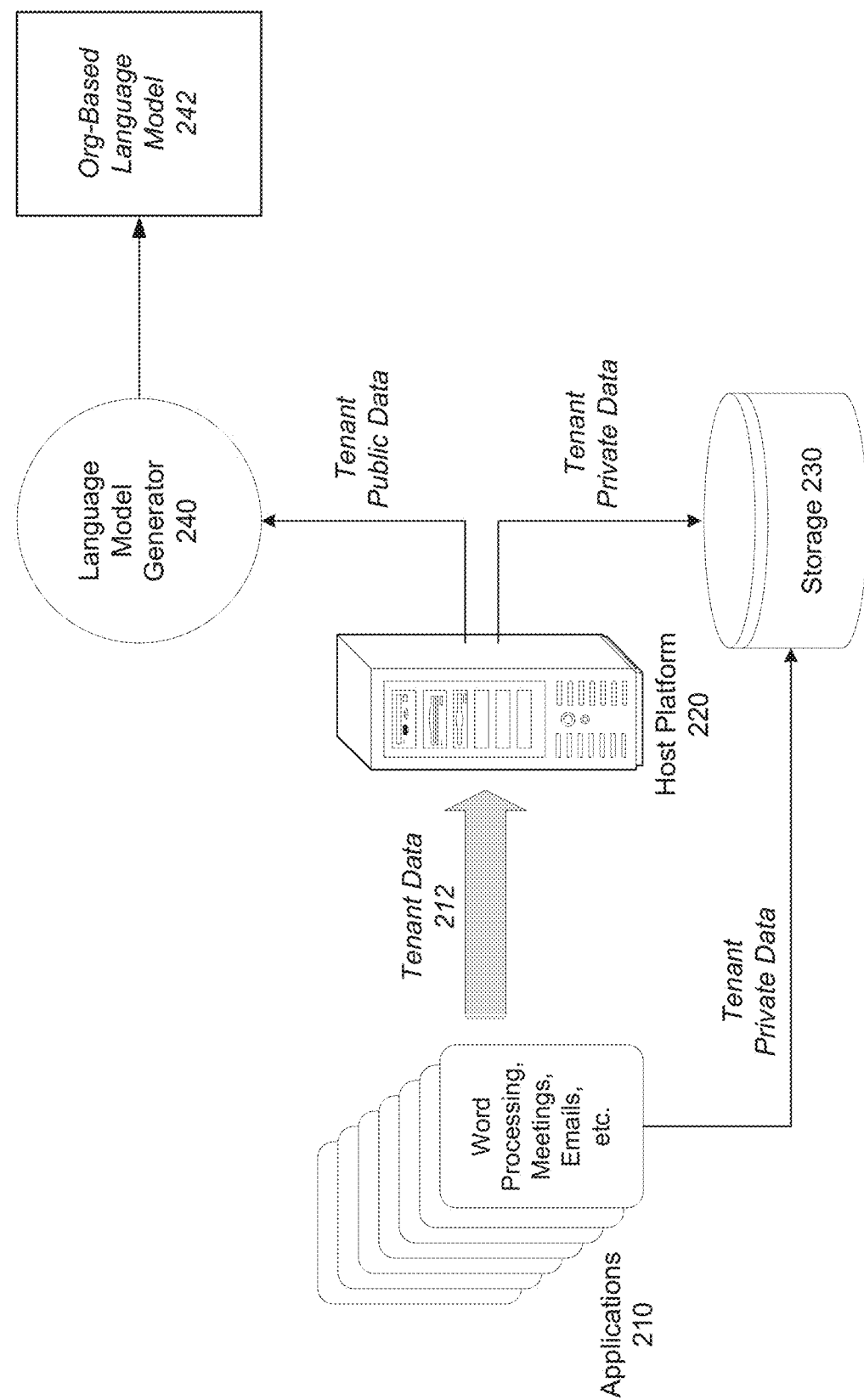

300

ORGANIZATIONAL-BASED LANGUAGE MODEL GENERATION

BACKGROUND

Speech recognition is a process in which a machine (e.g., a computer, etc.) identifies words and phrases from spoken input and converts the speech into a machine-readable format (e.g., text, etc.). Speech recognition is typically performed using acoustic and/or language models representing a relationship between linguistic units of speech and audio signals. The models may match sounds with word sequences to help distinguish between words that sound similar. Applications that use speech recognition are steadily growing and include call-based applications, text generation applications, meeting applications, and many others.

Applications that perform speech recognition typically rely on models trained using data acquired from the World Wide Web. The benefit of using the web data is that it is free and easy to acquire making it popular among developers of speech recognition models. The problem with this data is that it is generic in nature. Because of this, the resulting the trained model is considered a generic language model. While the generic language model may cover a wide array of generalized speech/topics, it may struggle to recognize terms that are specific to a particular group of people.

Unique terminology can develop within a field or even a particular organization and which may not be prevalent outside the organization. For example, project IDs, names of people, places, manner of speech, descriptive processes, and the like, among the organization users may have little or no use outside of the company. As a result, a generic language model may not be aware of such terms and can often fail to identify this wording. Therefore, what is needed is technology that can generate more specific models for speech recognition within an organization.

BRIEF DESCRIPTION OF THE DRAWINGS

FIG. 2 is a diagram illustrating a process of generating an organizational-based language model according to some embodiments.

DETAILED DESCRIPTION

Figure 1A:
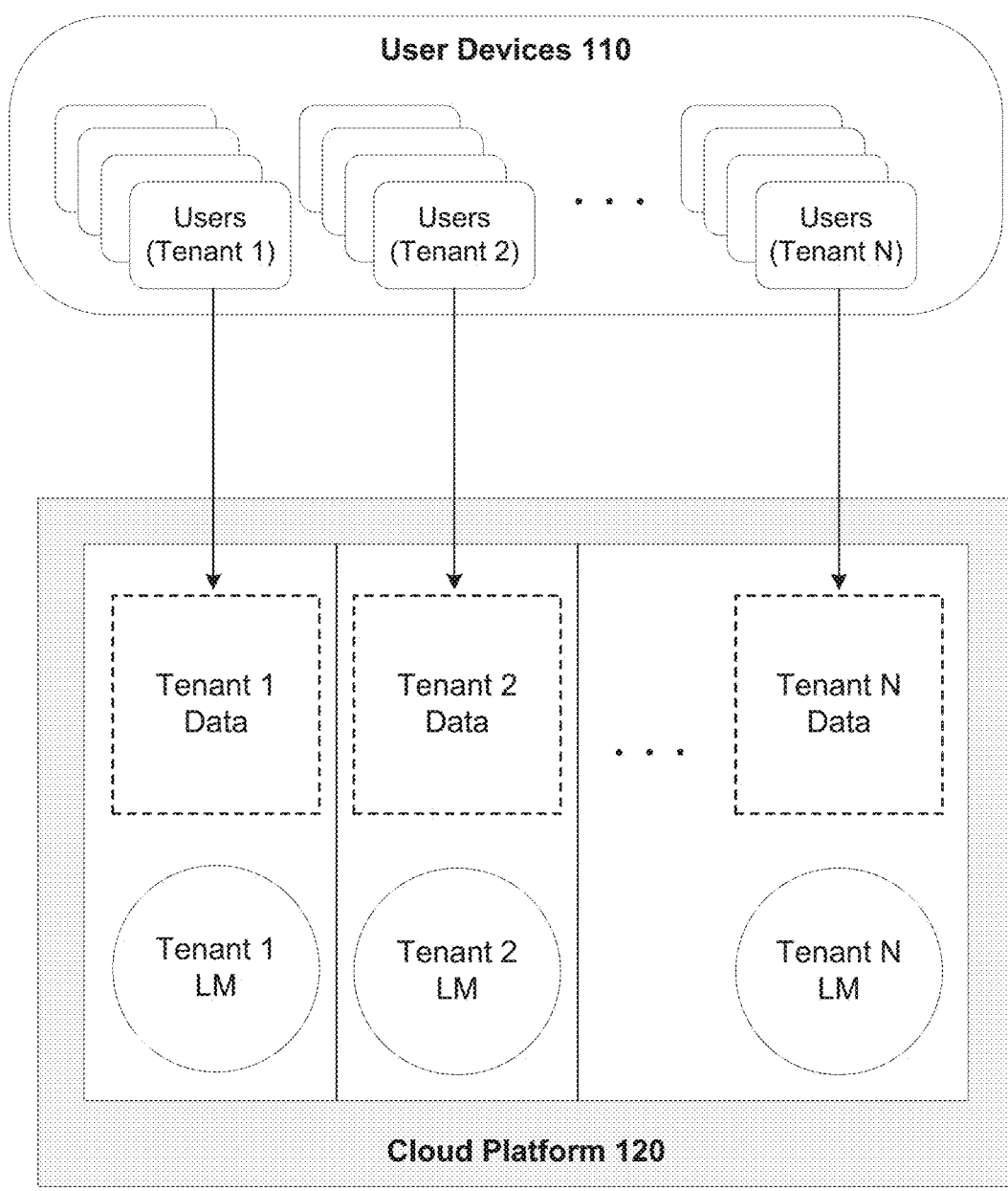
FIG. 1A is a diagram illustrating a multi-tenant architecture in a cloud computing environment according to some embodiments.

The following description is provided to enable any person in the art to make and use the described embodiments. Various modifications, however, will remain readily-apparent to those in the art.

The example embodiments provide a process and an architecture for generating an organizational-specific language model. In these examples, an organization may refer to a company, a business, a group, or the like, which are commonly engaged in an activity. Users within an organization may have various terms of art, manner of speech, phrases, terminology, and the like, which are uniquely used within the organization. By creating an organizational-specific language model, the example embodiments can improve speech recognition for users of that organization. For example, applications that are used within the company such as email applications, meeting applications, word processing applications, and the like, may incorporate the organizational-specific language model for purposes of speech recognition. The language model may be used to identify words, phrases, and the like, from spoken audio input.

In some embodiments, the architecture used to create the organizational-based language model may be a cloud environment where the organization is a tenant. In this scenario, the cloud environment may be multi-tenanted and may create different respective organizational-based language models for each respective tenant, or those tenants which opt in for such a service. Here, the cloud platform may host various applications such as office-based applications including word processing, email, meetings, spreadsheets, presentation-based software, and the like. As users within the company interact with these applications, training data may be collected by the system. The training data may be text content that is acquired from documents, emails, meetings, and the like.

In these examples, the model may be generated based on company data (public within the company) but not necessarily publicly available to the general population. In other words, the data used for training the organizational-based model may be company-specific data that is publicly available to the users of the company. By generating an organizational-based or organizational-specific language model, recognized speech may be more accurate for applications and other actions taken at an organizational-level. This is because organizations may have different terminology when it comes to items such as project names, style of speech, contact names, and other company-specific jargon that may differ from one organization to the next.

The training data may be acquired/collected from various applications that are used within the organization. For example, the company may use a suite of applications that encompass various services including email, word processing, spreadsheet, meetings, instant messaging, and the like, which can be used within business environments. The applications may be hosted within the cloud platform and provided to the users of the organization as a tenant of the cloud platform. Within the organization, data that is created using these applications may be considered public if it is available organization-wide, and private if it is only available to a specific subset of users within the organization.

For example, a small subset of users on a particular project may communicate with each other via email or a meeting application. Here, the users may create a channel or other group identifier that is labeled as private. Therefore, all documents, communications, meetings, and the like arising from the private channel source may be considered private data that is not be used for training an organizational-based language model. Meanwhile, data that is labeled as public (or openly available within the company) may be considered publicly available within the organization and used by the system herein for creating the organizational-based language model.

FIG. 1A illustrates a multi-tenant architecture 100A in a cloud computing environment according to some embodiments. Referring to FIG. 1A, the cloud computing architecture 100A includes a cloud platform 120 which hosts data and applications for a plurality of tenants including tenant 1, tenant 2, . . . tenant N. Each tenant may have its own memory and processing components within the cloud platform 120. For example, each tenant may be given its own virtual machine or group of virtual machines which segregate the data and the applications of each respective tenant separate and private from the other tenants. Each tenant may have their own respective group of users which access the cloud platform 120 through user devices 110. Each user may be assigned its own account, for example, a mailbox, a user account, a sign-on, or the like, which is associated with a particular tenant.

Figure 1B:
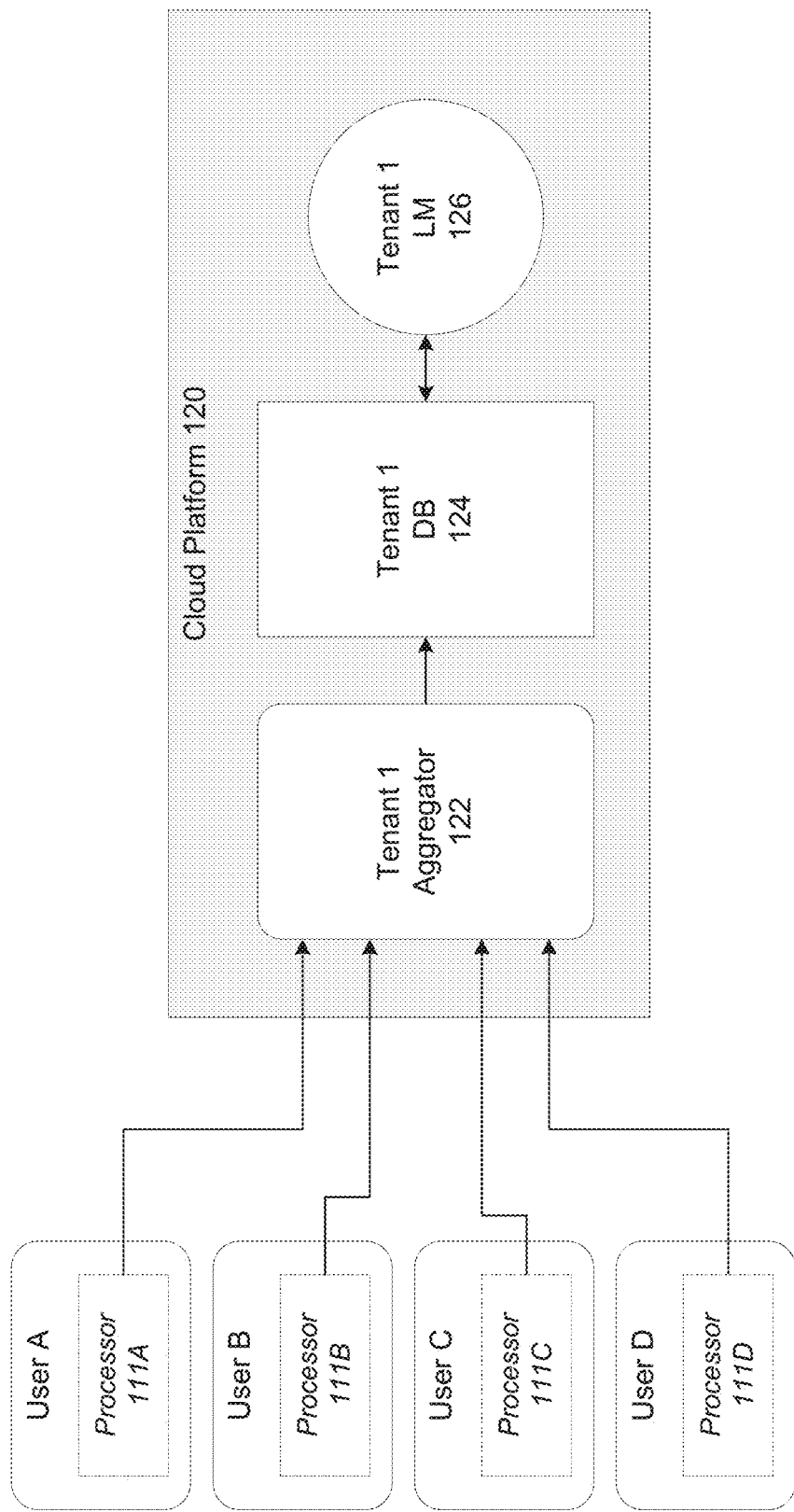
FIG. 1B is a diagram illustrating a tenant architecture for generating an organizational-based language model according to some embodiments.

FIG. 1B illustrates a tenant architecture 100B for generating an organizational-based language model according to some embodiments. The architecture 100B is an example of an architecture for a single tenant within the multi-tenant architecture 100A shown in FIG. 1A. Referring to FIG. 1B, a plurality of users A, B, C, and D, are associated with a common organization. In this example, the organization corresponds to tenant 1 hosted by the cloud platform 120. In this example, the cloud platform 120 may include services or other modules such as aggregator 122 that receive data from the plurality of users A, B, C, and D, aggregate the data, and store the aggregated data in a tenant database 124. The aggregated data stored in the tenant DB 124 may be used to train and re-train a language model 126 that is specific to tenant 1, and its users.

In the example of FIG. 1B, the plurality of users A-D may correspond to a plurality of user devices which are connected to the cloud platform 120 via a network such as the Internet, a private network, or the like. In this example, the data aggregation may include both a cloud-based component (e.g., aggregator 122) as well as a user-based component (e.g., a processor) which is associated with each user. For example, a processor 111A may be associated with user A, a processor 111B may be associated with user B, a processor 111C may be associated with user C, and processor 111D associated with user D. The processors 111A-111D may be services, programs, or the like, which collect data associated with a respective user account such as a mailbox, an email, a login, etc., that are accessed using a user device such as a laptop, a personal computer, a tablet, a smart phone, and the like. The processors 111A-111D may identify data as being either public or private, and forward only public data to the aggregator 122 on the cloud platform 120. If a data is labeled as private, the processors 111A-111D may prevent the data from being transmitted to the aggregator 122 to thereby preserve privacy of data.

The system described herein may automatically generate an organization level language model using the organization's data. In some embodiments, the system may include a user-side which includes a processor for collecting and filtering out private data, and a host side which includes a central data aggregator for aggregating data from multiple users of the tenant/organization. The host platform may also include a model builder which can train a machine learning language model based on the organization specific data. As a result, the language model may better identifier technical words, entities, projects, contact names, and other jargon related to this organization whether it's a small or a large corporation.

A use case for the organizational-based language model is to help power speech recognition services provided to this organization and improve the performance and its user's experience. Here, speech services may include first-party speech applications such as word processing applications, meeting applications, and the like, and $3^{rd}$ party applications through speech-based application programming interfaces (APIs). There could be other use-cases in the future besides speech recognition like spelling correction or enterprise search within the organization electronic data.

One challenges of the system described herein is that the data set used to generate the organizational-based language model should be compliant with the rules and regulations followed by network and cloud storage providers. Storing and using business data comes with the challenge of privacy and General Data Protection Regulation (GDPR). In order for a language model to be utilized across the entire organization, the data used to train this model should come from sources available to anyone in the organization. For this reason, the system restricts the data aggregation process to using public data (e.g., group emails, meeting content, documents, etc.) while avoiding private sources to prevent leakage of private information. The public data may include emails, documents, and the like, which contain text rich with contact names, project and product names, and technical language understood in the context of the organization and shared on the organization discussion groups.

Other requirements may include freshness and integrity. By freshness, the system may capture data sources that have the latest organization terminology (e.g. project and product names). In addition, the system may retire older data that is obsolete or possibly deleted by the original source. To maintain integrity, the system may check the status of the data sources and retire any utilized source that was previously designated as a public source and has subsequently become private following an action from the resource creator or administrator. Furthermore, the process should be correct and secure. It is correct in the sense of filtering out duplicates and redundant information in each data source. It should run in a secure environment without human access and output components stored in secure storage. The processes should also avoid leaking data from one organization data source into another organization's model.

FIG. 2 illustrates a process 200 of generating an organizational-based language model according to some embodiments. Referring to FIG. 2, the process 200 is performed by a host platform 220. In this example, the host platform may collect organization data from one or more users interacting with software applications hosted by the host platform 220. The host platform 220 may be a cloud platform, a web server, or the like, in which multiple tenants are services through a common architecture. In the example of FIG. 2, an organization is a single tenant. Here, the organization has access to applications 210 which are used to create tenant data 212.

The tenant data 212 may be collected by user devices and forwarded to the host platform 220. In some embodiments, prior to the tenant data 212 being transmitted to the host platform 220, the tenant data 212 may be filtered to remove any private data of the organization. The private data may be filtered out and may remain in secure storage 230. Meanwhile, public data may be included in the tenant data 212 and used by a language model generator 240 to generate a tenant-based language model 242, which may also be referred to as a tenant-specific or organizational-specific language model.

In addition to the initial filtering process, the host platform 220 may subsequently detect tenant data has changed from public data to private data. In this case, the host platform can remove the data from the tenant public data so that it is not included in the training of the organizational-based language model 242. For example, the pieces of data received from the applications 210 may be labeled or tagged with unique IDs. The unique IDs may correspond to respective data channels (e.g., meeting groups, projects, email chains, etc.) where the data has been collected from. Initially, the channel may be labeled or tagged as public. However, at some point subsequently, the channel may be converted to private by a user, the platform 220, or the like. In this case, the unique ID of the channel may also be tagged as private. Accordingly, the host platform 220 may identify any pieces of data within the tenant data that are tagged with the unique ID that is now private and remove such data and send it to the storage 230.

In the example of FIG. 2, a single organization (tenant) is shown. However, it should be appreciated that the host platform 220 may have secure access to multiple tenants and their corresponding data. The host platform 220 may individually and separately generate a customized language model (organization-based) that is based on respective organization data of the respective tenants. Each tenant's data may be maintained separately and securely from the data of other organizations. The data may be maintained in a storage of the host platform 220 or an external storage connected to the host platform 220 such as via a network, etc.

Organization-specific data may improve the accuracy and specificity of an organization level language model. Organizations that are customers of business-application subscriptions that are provided from a central location such as a cloud platform, a database, a web server, or the like, may upload their organization data to a secure storage. This rich data can be used for building a language model that contains the technical terms, contact names and other jargon related to an organization. On the other hand, generic language model solutions rely on publicly available data on the World Wide Web or requesting donations of data. However, this process creates a generic language model, which may not be able to identify organizational-specific language, jargon, projects, contacts, etc. in an automatic fashion.

The aggregation of data may include a first step where data is aggregated from a plurality of users of the organization during a first period of time, and a second step where the aggregated data is accumulated with previously aggregated data used to train the organizational-specific language model. For example, the first step may be performed on a more frequent basis (e.g., hourly, semi-daily, daily, etc.) than the second step which is performed on a less frequent basis (e.g., weekly, bi-weekly, monthly, etc.)

For example, organizational data may be aggregated from user accounts on a first periodic basis. Here, the system may iteratively aggregate data from the users on a first periodic-interval such as semi-daily, daily, etc. After a second period of time (e.g., weekly, bi-weekly, monthly, etc.) the aggregated user data may be combined with previously captured aggregate data of the users. Language model training may be performed based on the combined data (new aggregated data plus historical aggregated data).

When the data is transmitted from the client-user side, it may be filtered so that only public data is provided to the cloud platform for aggregation. For example, the filtering process may ensure that private data is kept from being added to the aggregate such that only public data is retained. For example, data that has been tagged or associated with a private group, etc., may be considered private. The private data may be removed/filtered. However, if public data subsequently becomes private it can still be filtered out. For example, during the aggregation the system may keep a tag (e.g., a group ID, etc.) identifying where the data came from and also keep track of the group ID of all private groups at the organization. If the group ID subsequently matches a private group in the list, the system may remove the data that later becomes private. For example, a user may go to a group settings and change the settings to private. Each time an aggregation is performed, the system may check on the privacy of each data and the system may remove it when the aggregation is performed (e.g., weekly basis, etc.).

The generated language model may be biased for a particular organization with particular jargon, project names, technical words, entities, contact names, users, etc., that has been customized for this particular company. Meanwhile, a generic language model may not be very accurate in such cases. For example, some words would not even be covered in the general model at all. This is common in today's speech recognition. But how people speak when they discuss certain technical things may frequently include certain phrases that are specifically used by company users to discuss technical aspects which may be very different how the general population talks about things. It's not just the wording but also the style. The generated language model can be used within speech APIs, or the like. In some embodiments, the generated organizational-based language model can be used in combination with a generic model to perform speech recognition.

Figure 3:
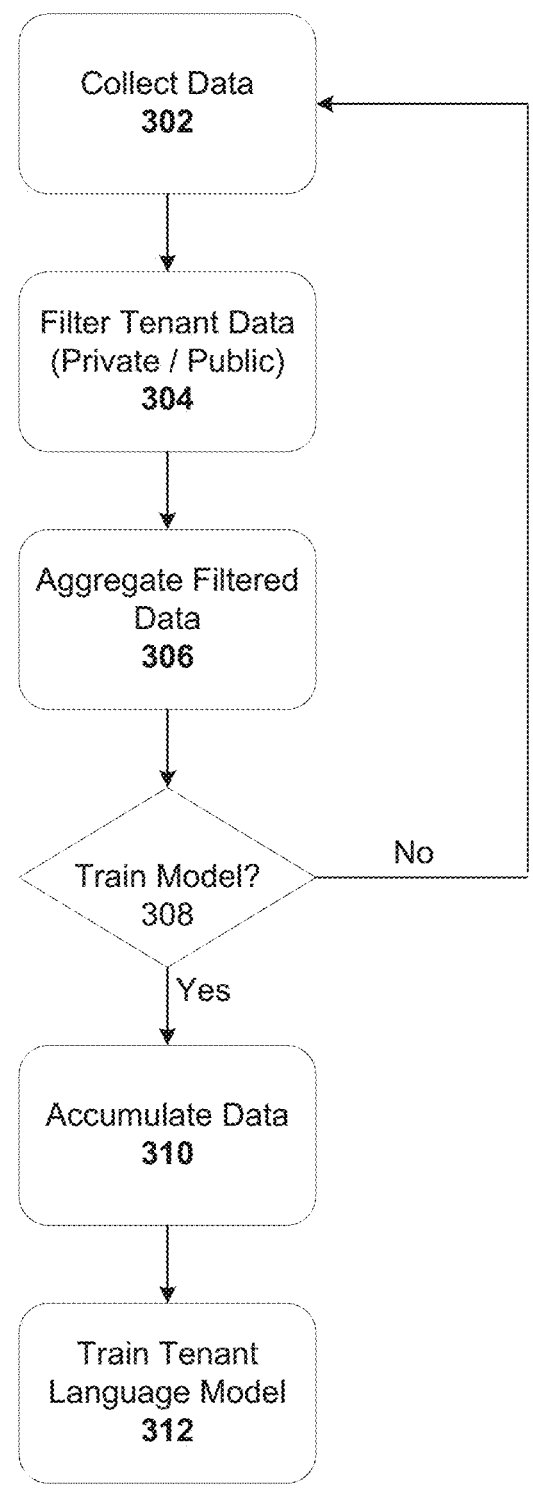
FIG. 3 is a diagram illustrating a process of iteratively accumulating filtered data according to some embodiments.

FIG. 3 illustrates a process 300 of iteratively accumulating filtered data according to some embodiments. Referring to FIG. 3, the process 300 includes collecting organization data and filtering the data, in 302 and 304. For example, the collected data may include public data (publicly available within the company) with private data (viewable to only a subset of users in the company) filtered out. Data channels such as emails, meetings (Teams, Skype, etc.), documents, and the like, may be labeled as private or public. Based on the label, the data may be tagged accordingly with an ID. The tag may be performed by the application where the data is created or it may be performed by the host platform. In some embodiments, the collecting in 302 and the filtering in 304 may be performed at the same time by the same application, service, etc. As another example, the filtering in 304 may be performed subsequent to the collecting in 302.

In 306, the filtered data is then aggregated with previously filtered data collected during the same the interval. This process can continue to repeat for a predetermined number of times, frequencies, days, etc. Here, in 308, the system may determine whether to repeat the data collection and aggregation, or whether the model is to be trained. For example, chunks of data may be captured at shorter-frequency intervals (e.g., once a day, once an hour, etc.) Here, the host platform may collect the data and aggregate the data in a secure storage over multiple iterations. This process can be repeated until the system determines to train the model in 308.

For example, after a longer period of time (e.g., a week, a month, etc.) the system may determine to train (or retrain) the organizational-based language model and in 310 the aggregated data may be accumulated with previous training data (from previous aggregations). If the model has yet to be trained, the accumulated data would only include the aggregated data. Filtering may also be applied in 310 where private data is removed from historical aggregations for data that was once public but has subsequently become private. Then, in 312 the accumulated data may be used to train (or retrain) an organizational-based language model (machine learning model) that can be used for speech recognition in various services of the organization such as email, meetings, document generation, and the like. The language model may be a statistical model, however, embodiments are not limited thereto.

In various embodiments, additional processes may be performed during the process 300 to improve the quality of the training data. In order to maintain freshness of the organization's data, the process may be run on frequent intervals (e.g., daily) via sub-processes that ingest data from each public group separately. The system may then aggregate all the daily extractions over a specified period (e.g. weekly). As another example, the process may apply a time stamp to each piece of aggregated data. During the accumulation of data in 310, older data is aggregated with the newest data. In some embodiments, the time stamp of the older data date may be checked and the data source may be retired if it is older than a certain period of time (e.g., 1 month, 6 months, 1 year, etc.) Here, the host platform may use a last-seen feature to record that last time that a piece of data has been seen from each data source. This feature may be applied during the accumulation of data in 310 to help identify older date and remove it.

In order to maintain data integrity, information may be added to each data source or its corresponding group ID. For example, the aggregation process in 306 may check the status of all the groups and fetch the IDs of private groups. The private groups IDs are used when aggregating the older data with the new data. Older data sources that came from then public but now private data sources may be removed from the aggregation moving forward. This way, the system can maintain the privacy of older data sources. For example, the host platform may store a list of all private group IDs. When a group is changed from public to private, the host platform may update the list of private group IDs. When an accumulation is performed in 310, the newly added group ID can be used to filter out previously saved public data. Therefore, data that is public at first, but later becomes private, can be tracked and removed as a training data during the accumulation in 310.

In order to build a high quality language model, the process may apply intelligent data selection and cleaning steps. For example, the host platform may remove duplicates and apply count squashing for high-frequency redundant data. If the collected data includes spam, robo-email, etc., the host platform may remove these data items from the aggregate because they can unnecessarily influence the language model. Furthermore, the host platform may perform a squash on a count of words that are repeatedly found so that such wording does not penalize or provide too much weight.

To maintain security of the data, the process may run in a secure environment that only machines can access without any human accessing the data. The host platform may store the components in secure data lake storage. The system may also be careful not to mix data between organizations and apply organization isolation through organization-ID based folders and separate processes.

Once the organizational-based language model has been trained, the model may be used for speech recognition on live data. Here, the organizational-based (tenant-based) model may be used by itself or in combination with a generic model to perform speech recognition. The organizational-based language model may have generic use or specific use cases (digital assistant, spelling corrections, meeting applications, word processing, etc.). In some embodiments, the organizational-based language model can be a statistical language model for speech recognition. A more technical term is ARPA and n-gram model.

Figure 4:
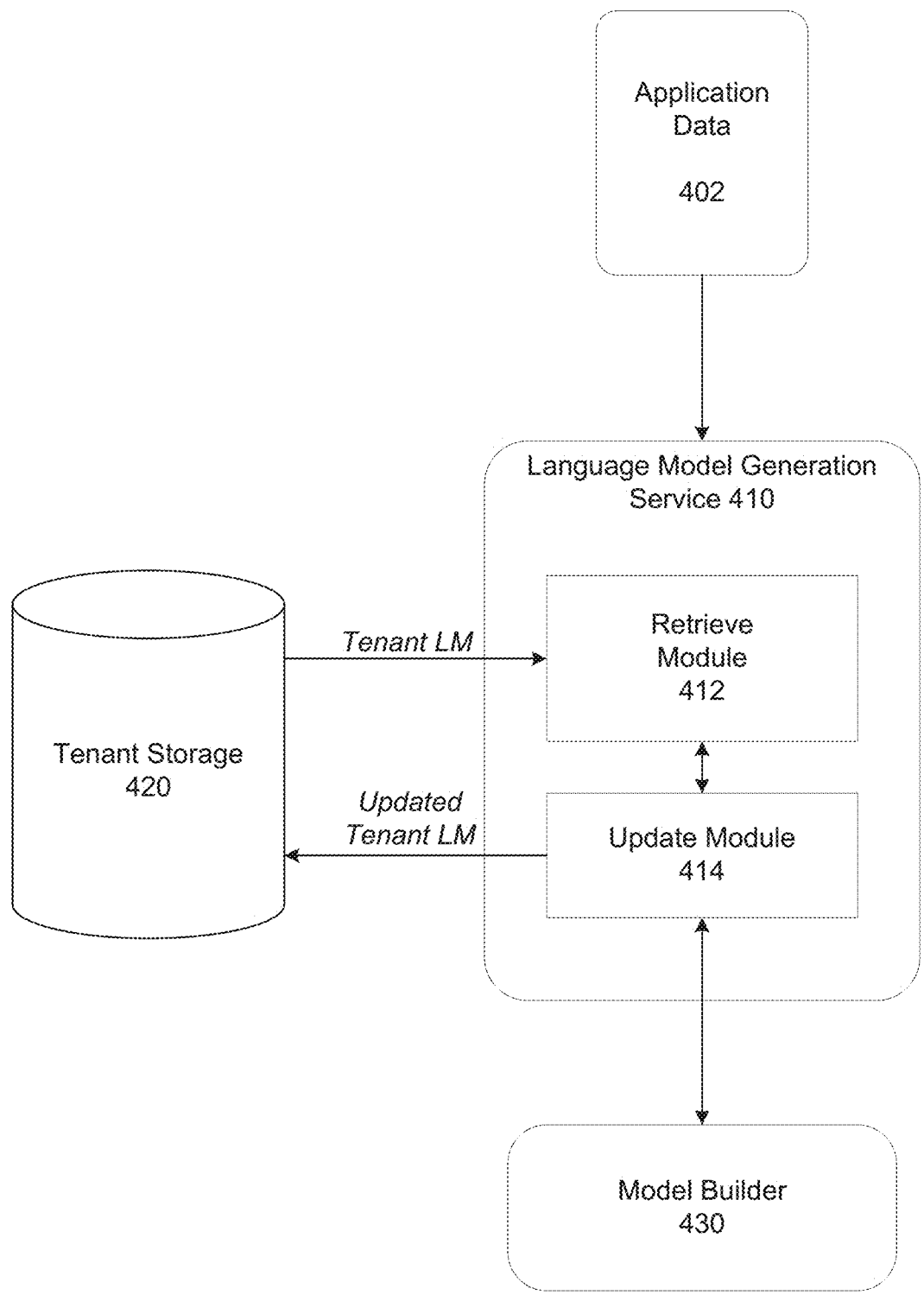
FIG. 4 is a diagram illustrating an architecture of a language model generation service according to some embodiments.

FIG. 4 illustrates an architecture 400 of a language model generation service according to some embodiments. Referring to FIG. 4, a language model generation service 410 may orchestrate the data collection and training of the organizational-based language model. The language model generation service 410 may include one or more application programming interfaces (APIs) which can be used to receive application data 402 from various data generating application such as word processing, meeting, calendar, email, and the like.

The language model generation service 410 may trigger an update or retraining of the organizational-based language model. For example, a retrieve module 412 may retrieve a previous training data from a tenant storage 420. The previous training data may be the data that was used most recently to train the model. An update module 414 may update the newly aggregated data from the application data 402 with the previous training data retrieved from tenant storage 420 and provide the accumulation of data to a model builder 430. In response, the model builder 430 may train or retrain the model. The model builder 430 may submit the trained model to the update module 414 which can store the trained model in the tenant storage 420. Although not shown, the language model generation service may also communicate with other applications that perform speech recognition and provide the applications with the trained organizational-based language model.

Figure 5:
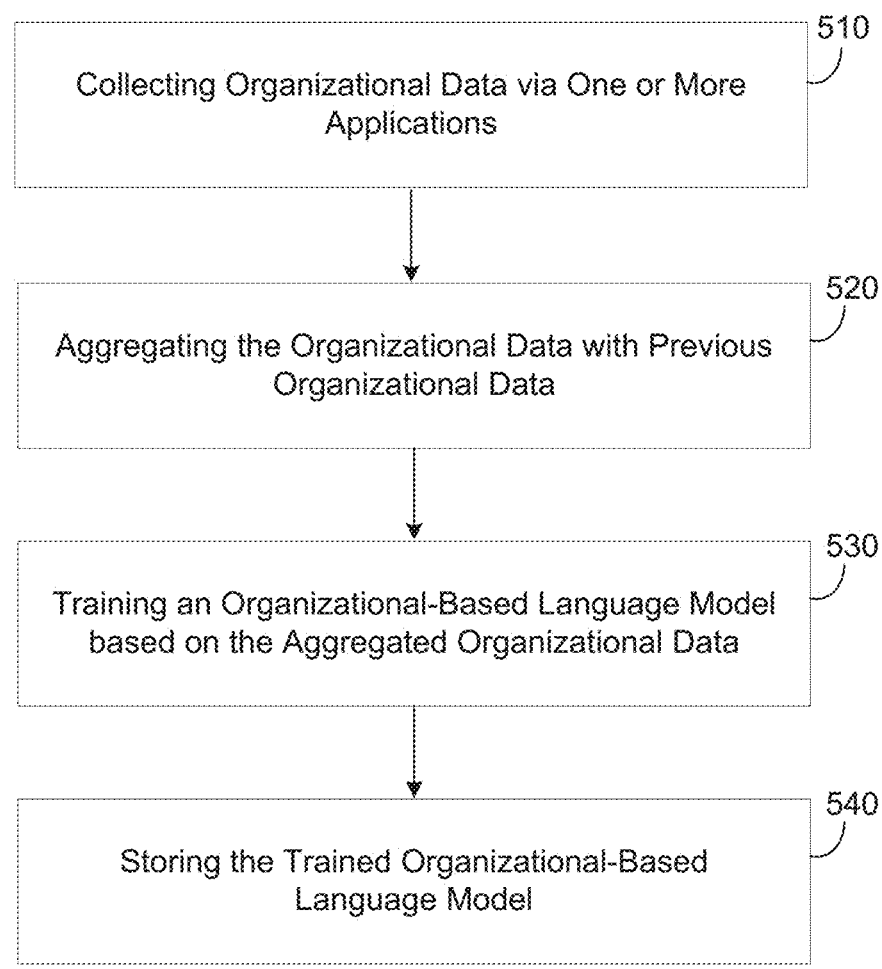
FIG. 5 is a diagram illustrating a method for generating an organizational-based language model according to some embodiments.

FIG. 5 illustrates a method 500 for generating an organizational-based language model according to some embodiments. For example, a processing unit (e.g., one or more processors, processing cores, processor threads, etc.) of computing device (e.g., mobile device, personal computer, server, etc.) may execute software program code to cause the computing device to perform the method 500. For example, the method 500 and all other methods and processes herein may be embodied in computer-executable program code that may be read from one or more non-transitory computer-readable media, such as a flash drive, a CD-ROM, a DVD-ROM, an external disk, a magnetic tape, or the like, and then stored in a compressed, uncompiled and/or encrypted format.

In some embodiments, hard-wired circuitry may be used instead of, or in combination with program code to implement the methods and processes. Embodiments are not limited to any specific combination of hardware and software. As an example, the method 500 may be performed by a single device such as a computer, or a combination of multiple devices such as multiple computers distributed across a network.

Referring to FIG. 5, in 510, the method may include collecting organizational data that is generated via one or more applications associated with an organization. Here, the system may identify whether data is public or private, and filter out the private data such that only the public data of the organization/tenant is collected. In some embodiments, the collecting may include preventing a piece of data of the organization from being collected in response to detecting that a source of the piece of data is a private data source. In some embodiments, the collecting may include capturing text content from one or more of an email application, a word processor application, and a meeting application, hosted by a cloud platform where the organization is a tenant.

The collecting may be performed periodically such as once an hour, once every 4 hours, once a day, once a week, or the like. Furthermore, the collecting may include collecting text-based content such as words from a document, words from an email, words spoken during a meeting, and the like. In this example, the system may collect text content from one or more of an email application, a word processor application, and a meeting application, hosted by a cloud platform where the organization is a tenant.

In 520, the method may include aggregating the collected organizational data with previously collected organizational data to generate aggregated organizational training data. For example, the periodically collected data may be added to any existing data that is already stored for the tenant/organization. In other words, the organization's data may continually grow making the language model even more accurate. Furthermore, the aggregating may include removing any old data that is older than a predetermined period of time to maintain a freshness of the data. For example, data that is one year old, 2 years old, 3 months old, six months old, or the like, may be removed.

In 530, the method may include training an organizational-based language model for speech processing based on the aggregated organizational training data. For example, the organizational-language model may include a machine learning model such as a neural network, a classification model, a statistical machine learning model, and the like. As a result of the training, the model may learn organization-specific terms based on the aggregated training data. In 540, the method may include storing the trained organizational-based language model. The method may further include executing the method further comprises executing a speech recognition application which has incorporated therein the trained organizational-based language model. For example, the speech recognition application may be incorporated within a meeting application, a word processor application, an email application, a messaging application, or the like.

In some embodiments, the aggregating may include tagging a piece of data within the organizational data with a respective channel identification. For example, the tagging may include tagging data with a unique ID associated with the channel. The system may keep a list of all channel IDs that are public and private. Therefore, when collecting/filtering the data, the system may know which data to send to the cloud platform for aggregation and which data to ignore or otherwise prevent from being sent to the cloud platform based on whether the channel where the data is collected from is labeled as private. In this example, the method may further include detecting that the channel identification has been changed from public to private, and in response, removing the piece of data from the aggregated organizational training data.

Figure 6:
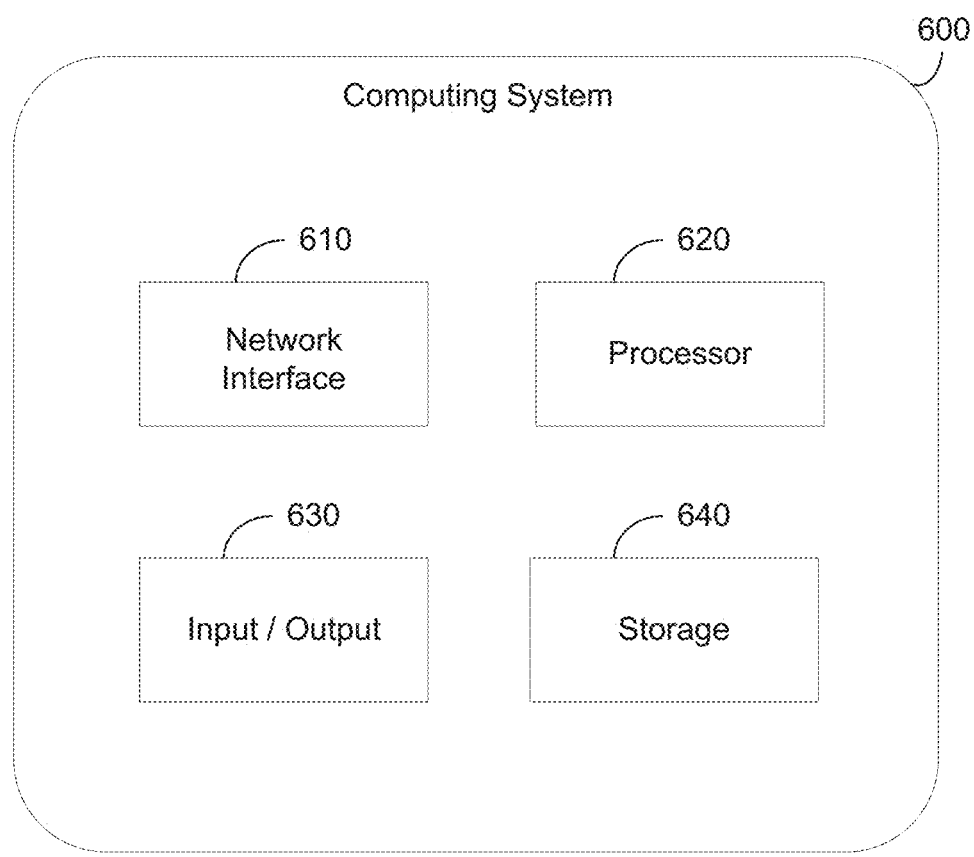
FIG. 6 is a diagram illustrating an example of a computing node architecture according to some embodiments.

FIG. 6 illustrates an example of a computing node architecture 600 according to some embodiments. For example, the computing system 600 may be a server node, a cloud data center, a database, a user device such as a shared agent device (e.g., mobile phone, tablet, laptop, etc.), or the like. In some embodiments, the computing system 600 may be distributed across multiple devices. Referring to FIG. 6, the computing system 600 includes a network interface 610, a processor 620, an input/output 630, and a storage device 640. Although not shown in FIG. 6, the computing system 600 may also include or be electronically connected to other components such as a display, a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. In some embodiments, the network interface 610 may transmit data via a cellular network, which may be referred to as a mobile network or voice network. In some embodiment, the network interface 610 may transmit data via a data network (Internet), which may be referred to as a Wi-Fi network or the like. The processor 620 may include one or more processing devices each including one or more processing cores. In some examples, the processor 620 is a multicore processor or a plurality of multicore processors. Also, the processor 620 may be fixed or it may be reconfigurable.

The input and the output 630 may include interfaces for inputting data to the computing system 600 and for outputting data from the computing system. For example, data may be output to an embedded or an external display, a storage drive, a printer, and the like. For example, the input and the output 630 may include one or more ports, interfaces, cables, wires, boards, and/or the like, with input/output capabilities. The network interface 610, the output 630, or a combination thereof, may interact with applications executing on other devices.

The storage device 640 is not limited to a particular storage device and may include any known memory device such as RAM, ROM, hard disk, object storage, blob storage, and the like, and may or may not be included within the cloud environment. The storage 640 may include partitions of storage and one or more indexes identifying location of stored objects. The storage 640 may store software modules or other instructions which can be executed by the processor 620 to perform the method 500 shown in FIG. 5. Also, according to various embodiments, the storage 640 may store training progress data of various users conducting training/learning via the computing system 600. For example, the storage 640 may store JSON files having stored therein content of learning information that has been performed by a user, etc.

Referring to FIG. 6, the processor 620 may collect organizational data that is generated via one or more applications associated with an organization. Here, the processor 620 may determine whether the data is public data or private data based on a label of the source of the data. For data labeled as private, the processor 620 may filter out this data and only store an ID of the data without storing the private data itself. Meanwhile, the processor 620 may store both the ID and the content of data determined as public. The processor 620 may further aggregate the collected organizational data with previously collected organizational data to generate aggregated organizational training data. The processor 620 may train an organizational-based language model for speech processing based on the aggregated organizational training data. Here, the storage 640 may store the trained organizational-based language model.

In some embodiments, the processor 620 may prevent a piece of data of the organization from being collected in response to the processor detecting that a source of the piece of data is a private data source. In some embodiments, the processor 620 may train a machine learning model such as a statistical machine learning model, a neural network, a classification model, and the like, to learn organization-specific terms based on the aggregated organizational training data. In some embodiments, the processor 620 may collect text content from one or more of an email application, a word processor application, and a meeting application, hosted by a cloud platform where the organization is a tenant.

In some embodiments, the processor 620 may clean the aggregated organizational training data to remove data duplicates and remove data that is older than a predetermined period of time. In some embodiments, the processor 620 may tag a piece of data within the organizational data with a respective channel identification. In some embodiments, the processor 620 may detect that the channel identification has been changed from public to private, and in response, remove the piece of data from the aggregated organizational training data. In some embodiments, the processor 620 may receive organization data from a user device where the organization data is generated. In some embodiments, the processor 620 may execute a speech recognition application based on the trained organizational-based language model.

The above-described diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions.

Embodiments described herein are solely for the purpose of illustration. Those in the art will recognize other embodiments may be practiced with modifications and alterations to that described above.

What is claimed is:

1. A computing system comprising:
    a processor configured to
        collect organizational data that is generated via one or more applications associated with an organization,
        identify a group within the organization which is not available to all users within the organization,
        remove data within the collected organizational data associated with the identified group to generate filtered organizational data,
        aggregate the filtered organizational data with previously collected organizational data to generate aggregated organizational training data, and
        train an organizational-based language model for speech processing based on the aggregated organizational training data; and
    a storage configured to store the trained organizational-based language model.

2. The computing system of claim 1, wherein the processor prevents a piece of data of the organization from being collected in response to the processor detecting that a source of the piece of data is a private data source.

3. The computing system of claim 1, wherein the processor is configured to train a statistical machine learning model to learn organization-specific terms based on the aggregated organizational training data.

4. The computing system of claim 1, wherein the processor is configured to collect text content from one or more of an email application, a word processor application, and a meeting application, hosted by a cloud platform where the organization is a tenant.

5. The computing system of claim 1, wherein the processor is further configured to clean the aggregated organizational training data to remove data duplicates and remove data that is older than a predetermined period of time.

6. The computing system of claim 1, wherein the processor is configured to tag a piece of data within the organizational data with a respective channel identifier of a group of users that created the piece of data.

7. The computing system of claim 6, wherein the processor is further configured to detect that the channel identifier identifies a group that has been converted from publicly available within the organization to private within the organization by a user of the group, and in response, remove the piece of data from the aggregated organizational training data.

8. The computing system of claim 1, wherein the processor is configured to receive organization data from a user device where the organization data is generated.

9. The computing system of claim 1, wherein the processor is further configured to execute a speech recognition application based on the trained organizational-based language model.

10. The computing system of claim 1, wherein the processor is configured to remove communications between users of the identified group that occurred via a private data channel between the users within the one or more applications.

11. A method comprising:
    collecting organizational data that is generated via one or more applications associated with an organization;
    identifying a group within the organization which is not available to all users within the organization;
    removing data within the collected organizational data associated with the identified group to generate filtered organizational data;
    aggregating the filtered organizational data with previously collected organizational data to generate aggregated organizational training data;
    training an organizational-based language model for speech processing based on the aggregated organizational training data; and
    storing the trained organizational-based language model.

12. The method of claim 11, wherein the training comprises training a statistical machine learning model to learn organization-specific terms based on the aggregated organizational training data.

13. The method of claim 11, wherein the collecting comprises collecting text content from one or more of an email application, a word processor application, and a meeting application, hosted by a cloud platform where the organization is a tenant.

14. The method of claim 11, wherein the aggregating further comprises cleaning the aggregated organizational training data to remove data duplicates and remove data that is older than a predetermined period of time.

15. The method of claim 11, wherein the aggregating comprises tagging a piece of data within the organizational data with a respective channel identifier of a group of users that created the piece of data.

16. The method of claim 15, wherein the method further comprises detecting that the channel identifier identifies a group that has been converted from publicly available within the organization to private within the organization by a user of the group, and in response, removing the piece of data from the aggregated organizational training data.

17. The method of claim 11, wherein the collecting comprises receiving organization data from a user device where the organization data is generated.

18. The method of claim 11, wherein the method further comprises executing a speech recognition application based on the trained organizational-based language model.

19. The method of claim 11, wherein the collecting comprises preventing a piece of data of the organization from being collected in response to detecting that a source of the piece of data is a private data source.

20. A method comprising:
- filtering out private group data from data collected via data channels of one or more applications associated with an organization;
- aggregating remaining data from the filtered data with previously collected public data of the organization to generate aggregated public training data;
- training an organizational-based language model for speech processing based on the aggregated public training data; and
- storing the trained organizational-based language model.

21. The method of claim 20, wherein the filtering out comprises deleting communication data between users of a private group that is transmitted via a private channel and storing data that is labeled as public data within tenant data stored in a multi-tenant cloud computing environment.

* * * * *